US012743658B2

(12) United States Patent
Cho et al.

(10) Patent No.: US 12,743,658 B2
(45) Date of Patent: Sep. 22, 2026

(54) ELECTRONIC APPARATUS FOR WEIGHT REDUCTION OF 3D OBJECT DETECTION MODEL BASED ON KNOWLEDGE DISTILLATION AND WEIGHT REDUCTION METHOD THEREOF

(71) Applicant: AJOU UNIVERSITY INDUSTRY-ACADEMIC COOPERATION FOUNDATION, Suwon (KR)

(72) Inventors: Hyeon Cho, Suwon-Si (KR); Won Jun Hwang, Seoul (KR); Geon Woo Baek, Anyang (KR)

(73) Assignee: AJOU UNIVERSITY INDUSTRY-ACADEMIC COOPERATION FOUNDATION, Suwon (KR)

( * ) Notice: Subject to any disclaimer, the term of this patent is extended or adjusted under 35 U.S.C. 154(b) by 831 days.

(21) Appl. No.: 18/071,058

(22) Filed: Nov. 29, 2022

(65) Prior Publication Data

US 2024/0028954 A1 Jan. 25, 2024

(30) Foreign Application Priority Data

Jul. 19, 2022 (KR) ........................ 10-2022-0088937

(51) Int. Cl.

| | |
|---|---|
| ***G06F 17/00*** | (2019.01) |
| ***G06F 7/00*** | (2006.01) |
| ***G06N 20/00*** | (2019.01) |

(52) U.S. Cl.

CPC .................................... *G06N 20/00* (2019.01)

(58) Field of Classification Search

CPC ...................................................... G06N 20/00
USPC ............................................................ 706/12
See application file for complete search history.

(56) References Cited

U.S. PATENT DOCUMENTS

| | | | | |
|---|---|---|---|---|
| 10,769,428 | B2 * | 9/2020 | Sharma | G06F 18/214 |
| 2022/0004803 | A1 * | 1/2022 | Li | G06F 18/22 |
| 2022/0335303 | A1 * | 10/2022 | Haidar | G06N 3/082 |
| 2023/0108621 | A1 * | 4/2023 | Jeon | G06T 7/73 382/103 |

(Continued)

OTHER PUBLICATIONS

TKD: Interchange Transfer-based Knowledge Distillation for 3D Object Detection; arXiv:2205.15531v1 [cs.CV] May 31, 2022.

(Continued)

*Primary Examiner* — Pavan Mamillapalli
(74) *Attorney, Agent, or Firm* — McCarter & English, LLP

(57) ABSTRACT

Provided is an electronic apparatus for lightweight of a three dimensional (3D) object detection model based on knowledge distillation, the electronic device including: a backbone network module configured to perform knowledge distillation such that a first feature map of a teacher network and a second feature map of a student network extracted through input point cloud data are made identical to as each other; and a self-attention module configured to acquire a plurality of pieces of detection information from a plurality of detection heads for 3D object detection, respectively, using the first feature map and the second feature map, and perform knowledge distillation using a relation-aware self-attention calculated based on the acquired plurality of pieces of detection information.

12 Claims, 5 Drawing Sheets

(56) References Cited

U.S. PATENT DOCUMENTS

2023/0274526 A1 * 8/2023 Hwang ................ G06V 10/764

OTHER PUBLICATIONS

Caesar eta I., nuScenes: A multimodal dataset; for autonomous driving. Proceedings of the IEEE/CVF Conference on Computer Vision and Pattern Recognition. pp. 11621-11631, (2020).
Chen et al., Fast Point R-CNN. Proceedings of the; IEEE/CVF International Conference on Computer Vision. Pages 9775-9784, (2019).
Chen et al., Learning Efficient Object Detection Models with Knowledge Distillation. 31st Conference on Neural Information Processing Systems, NIPS. 10 pages, (2017).
Dai et al., Dynamic Head: Unifying Object Detection Heads with Attentions. Proceedings of the; IEEE/CVF Conference on Computer Vision and Pattern Recognition. pp. 7373-7382, (2021).
Engelcke et al., Vote3deep: Fast Object Detection in 3D Point Clouds Using Efficient Convolutional Neural Networks. IEEE International Conference on Robotics and Automation (ICRA). pp. 1355-1361, (2017).
Ge et al., AFDet: Anchor Free One Stage 3D Object Detection. arXiv:2006.12671v2. 10 pages, (2020).
Guo et al., LIGA-Stereo: Learning LiDAR Geometry Aware Representations for Stereo-based 3D Detector. Proceedings of the IEEE/CVF International Conference on Computer Vision. pp. 3153-3163, (2021).
He et al., Structure Aware Single-stage 3D Object Detection from Point Cloud. Proceedings of the IEEE/CVF Conference on Computer Vision and Pattern Recognition. pp. 11873-11882, (2020).
Hinton et al., Distilling the Knowledge in a Neural Network. arXiv preprint arXiv. 1503.02531v1. 9 pages, (2015).
Huang et al., Revisiting Knowledge Distillation: An Inheritance and Exploration Framework. Proceedings of the IEEE/CVF Conference on Computer Vision and Pattern Recognition, pp. 3579-3588, (2021).
Kim et al., Paraphrasing Complex Network: Network Compression via Factor Transfer. 32nd Conference on Neural Information Processing Systems. 10 pages, (2018).
Kingma et al., Adam: A method for stochastic optimization. ICLR. 15 pages, (2015).
Lang et al., Pointpillars: Fast Encoders for Object Detection from Point Clouds. Proceedings of the IEEE/CVF Conference on Computer Vision and Pattern Recognition. pp. 12697-12705, (2019).
Li et al., Mimicking Very Efficient Network for Object Detection. Proceedings of the IEEE Conference on Computer Vision and Pattern Recognition. pp. 6356-6364, (2017).
Li, 3D Fully Convolutional Network for Vehicle Detection in Point Cloud. IEEE/RSJ International Conference on Intelligent Robots and Systems (IROS). pp. 1513-1518, (2017).
Mirzadeh et al., Improved Knowledge Distillation via Teacher Assistant. Proceedings of the AAAI Conference on Artificial Intelligence. pp. 5191-5198, (2020).
Ngiam et al., Starnet: Targeted Computation for Object Detection in Point Clouds. arXiva:1908.11069v3, (2019).
Park et al., Relational Knowledge Distillation. Proceedings of the IEEE/CVF Conference on Computer Vision and Pattern Recognition. pp. 3967-3976, (2019).
Qi et al., Frustum PointNets for 3D Object Detection from RGB-D Data. Proceedings of the IEEE conference on computer vision and pattern recognition. pp. 918-927, (2018).
Qi et al., Pointnet: Deep Learning on Point Sets for 3D Classification and Segmentation. Proceedings of the IEEE Conference on Computer Vision and Pattern Recognition. pp. 652-660, (2017).
Romero et al., Fitnets: Hints for Thin Deep Nets. ICLR. 13 pages, (2015).
Shi et al., Point-GNN: Graph Neural Network for 3D Object Detection in a Point Cloud. Proceedings of the IEEE/CVF Conference on Computer Vision and Pattern Recognition. pp. 1711-1719, (2020).
Shi et al., PointRCNN: 3D Object Proposal Generation and Detection from Point Cloud. Proceedings of the IEEE/CVF conference on Computer Vision and Pattern Recognition. pp. 770-779, (2019).
Shi et al., PV-RCNN: Point-Voxel Feature Set Abstraction for 3D Object Detection. Proceedings of the IEEE/CVF Conference on Computer Vision and Pattern Recognition. pp. 10529-10538, (2020).
Simon et al., Complex-YOLO: An Euler-Region-Proposal for Real-time 3D Object Detection on Point Clouds. Proceedings of the European Conference on Computer Vision (ECCV) Workshops, 14 pages, (2018).
Smith, Cyclical Learning Rates for Training Neural Networks. IEEE Winter Conference on Applications of Computer Vision (WACV). pp. 464-472, (2017).
Son et al., Densely Guided Knowledge Distillation Using Multiple Teacher Assistants. Proceedings of the IEEE/CVF International Conference on Computer Vision. pp. 9395-9404, (2021).
Song et al., Deep Sliding Shapes for Amodal 3D Object Detection in RGB-D Images. Proceedings of the IEEE conference on Computer Vision and Pattern Recognition. pp. 808-816, (2016).
Sun et al., Scalability in Perception for Autonomous Driving: Waymo Open Dataset. Proceedings of the IEEE/CVF conference on Computer Vision and Pattern Recognition. pp. 2446-2454, (2020).
Tian et al., Contrastive Representation Distillation. ICLR. 19 pages, (2020).
Vaswani et al., Attention is all you Need. Advances in neural information. 31st Conference on Neural Information Processing Systems (NIPS 2017). 11 pages, (2017).
Wang et al., Distilling Object Detectors with Fine-grained Feature Imitation. Proceedings of the IEEE/CVF Conference on Computer Vision and Pattern Recognition. pp. 4933-4942, (2019).
Wang et al., Object Dgcnn: 3D Object Detection Using Dynamic Graphs. 35th Conference on Neural Information Processing Systems (NEURIPS 2021). 16 pages, (2021).
Wang et al., Pillar-based Object Detection for Autonomous Driving. European Conference on Computer Vision. pp. 18-34, (2020).
Yan et al., SECOND: Sparsely Embedded Convolutional Detection. Sensors. 2018;18(10):3337, 17 pages.
Yang et al., 3DSSD: Point-based 3D Single Stage Object Detector. Proceedings of the IEEE/CVF Conference on Computer Vision and Pattern Recognition. pp. 11040-11048, (2020).
Yang et al., Knowledge Distillation via Softmax Regression Representation Learning. ICLR. 14 pages, 2021.
Yang et al., PIXOR: Real-time 3D Object Detection from Point Clouds. Proceedings of the IEEE conference on Computer Vision and Pattern Recognition. pp. 7652-7660, (2018).
Yang et al., STD: Sparse-to-Dense 3D Object Detector for Point Cloud. Proceedings of the IEEE/CVF International Conference on Computer Vision. pp. 1951-1960, (2019).
Ye et al., HVnet: Hybrid Voxel Network for LiDAR Based 3D Object Detection. Proceedings of the IEEE/CVF Conference on Computer Vision and Pattern Recognition. pp. 1631-1640, (2020).
Yin et al., Center-based 3D Object Detection and Tracking. Proceedings of the IEEE/CVF Conference on Computer Vision and Pattern Recognition. pp. 11784-11793, (2021).
Zagoruyko et al., Paying More Attention to Attention: Improving the Performance of Convolutional Neural Networks via Attention Transfer. ICLR. 13 pages, (2017).
Zeng et al., Learning Transferable Features for Point Cloud Detection via 3D Contrastive Co-training. 35th Conference on Neural Information Processing Systems (NeurIPS 2021). 12 pages, (2021).
Zhang et al., Task-Oriented Feature Distillation. 34th Conference on Neural Information Processing Systems (NeurIPS). 13 pages, (2020).
Zhou et al., End-to-End Multi-View Fusion for 3D Object Detection in LiDAR Point Clouds. Conference on Robot Learning. pp. 923-932. PMLR, (2020).
Zhou et al., VoxelNet: End-to-End Learning for Point Cloud Based 3D Object Detection. Proceedings of the IEEE Conference on Computer Vision and Pattern Recognition. pp. 4490-4499, (2018).

* cited by examiner

ELECTRONIC APPARATUS FOR WEIGHT REDUCTION OF 3D OBJECT DETECTION MODEL BASED ON KNOWLEDGE DISTILLATION AND WEIGHT REDUCTION METHOD THEREOF

CROSS-REFERENCE TO RELATED APPLICATION

This application claims priority to and the benefit of Korean Patent Application No. 10-2022-0088937, filed on Jul. 19, 2022, the disclosure of which is incorporated herein by reference in its entirety.

BACKGROUND

1. Field of the Invention

The present invention relates to an electronic apparatus for weight reduction of a three dimensional (3D) object detection model based on knowledge distillation, and a weight reduction method thereof.

2. Discussion of Related Art

Knowledge distillation is one of learning methods in which a student network imitates a pre-trained teacher network.

Conventional knowledge distillation techniques have been developed mainly for a classification task or generally developed for a two-dimensional (2D) object detection model for detecting an object existing in an image.

In addition, a knowledge distillation technique applied to a three dimensional (3D) object detection model is not aimed at weight reduction, but is used for self-distillation to improve its own performance or used as an auxiliary device to fuse various types of input features.

Meanwhile, point cloud data used to detect 3D objects has different characteristics from 2D images due to the diversity of the same object that is caused by occlusion by other objects or the distance between points, and thus has a limitation in application to knowledge distillation techniques.

In addition, a 3D object detection model includes a plurality of detection heads for predicting a direction, a 3D size, and a position on 3D coordinates, and the like of a 3D object, and thus has a structure different from a 2D object detection model.

SUMMARY OF THE INVENTION

The present invention is directed to providing an electronic apparatus for designing a 3D object detection model having a reduced weight and a method thereof.

The present invention is directed to providing an electronic apparatus for applying a knowledge distillation technique to a point cloud-based 3D object detection model and a method thereof.

The present invention is directed to providing an electronic apparatus for performing knowledge distillation with higher performance and a method thereof.

The technical objectives of the present invention are not limited to the above, and other objectives may become apparent to those of ordinary skill in the art based on the following descriptions.

According to an aspect of the present invention, there is provided an electronic apparatus for lightweight of a three dimensional (3D) object detection model based on knowledge distillation, the electronic device including: a backbone network module configured to perform knowledge distillation such that a first feature map of a teacher network and a second feature map of a student network are made identical to as each other, wherein the first feature map and the second feature map are extracted through input point cloud data; and a self-attention module configured to acquire a plurality of pieces of detection information from a plurality of detection heads for 3D object detection, respectively, using the first feature map and the second feature map, and perform knowledge distillation using a relation-aware self-attention calculated based on the acquired plurality of pieces of detection information.

The backbone network module may be configured to: generate first compressed data and second compressed data from the first feature map and the second feature map, respectively, using an encoder; and perform the knowledge distillation such that the first compressed data and the second compressed data are made identical to each other.

The backbone network module may be configured to: reconstruct the second feature map from the first compressed data and reconstruct the first feature map from the second compressed data using a decoder.

The backbone network module may be configured to: allow an auto-encoder including the encoder and the decoder to be shared between the teacher network and the student network to perform the knowledge distillation.

The self-attention module may be configured to: acquire a plurality of pieces of first detection information from a plurality of first detection heads connected to the teacher network using the first feature map; and acquire a plurality of pieces of second detection information from a plurality of second detection heads connected to the student network using the second feature map.

The self-attention module may be configured to: calculate an inter-relation attention between the plurality of pieces of first detection information and an intra-relation attention between a plurality of pieces of third detection information each of which is obtained from a corresponding one of the plurality of first detection heads and related to a different object; and calculate an inter-relation attention between the plurality of pieces of second detection information and an intra-relation attention between a plurality of pieces of fourth detection information each of which is obtained from a corresponding one of the plurality of second detection heads and related to a different object.

The self-attention module may be configured to perform the knowledge distillation using the relation-aware self-attention that is obtained by fusing the inter-relation attention and the intra-relation attention of the teacher network.

According to another aspect of the present invention, there is provided a method of performing weight-lightening on a three dimensional (3D) object detection model based on knowledge distillation in an electronic apparatus, the method including: performing first knowledge distillation such that a first feature map of a teacher network and a second feature map of a student network are made identical to as each other wherein the first feature map and the second feature map are extracted through input point cloud data; and acquiring a plurality of pieces of detection information from a plurality of detection heads for 3D object detection, respectively, using the first feature map, and the second feature map, and performing second knowledge distillation using a relation-aware self-attention calculated based on the acquired plurality of pieces of detection information.

The performing of the first knowledge distillation may include: generating first compressed data and second compressed data from the first feature map and the second feature map, respectively, using an encoder; and performing the first knowledge distillation such that the first compressed data and the second compressed data are made identical to each other.

The performing of the first knowledge distillation may include reconstructing the second feature map from the first compressed data and reconstructing the first feature map from the second compressed data using a decoder.

The performing of the first knowledge distillation may include allowing an auto-encoder including the encoder and the decoder to be shared between the teacher network and the student network to perform the knowledge distillation.

The performing of the second knowledge distillation may include: acquiring a plurality of pieces of first detection information from a plurality of first detection heads connected to the teacher network using the first feature map; and acquiring a plurality of pieces of second detection information from a plurality of second detection heads connected to the student network using the second feature map.

The performing of the second knowledge distillation may include: calculating an inter-relation attention between the plurality of pieces of first detection information and an intra-relation attention between a plurality of pieces of third detection information each of which is obtained from a corresponding one of the plurality of first detection heads and related to a different object; and calculating an inter-relation attention between the plurality of pieces of second detection information and an intra-relation attention between a plurality of pieces of fourth detection information each of which is obtained from a corresponding one of the plurality of second detection heads and related to a different object.

The performing of the second knowledge distillation may include performing the knowledge distillation using the relation-aware self-attention that is obtained by fusing the inter-relation attention and the intra-relation attention of the teacher network.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
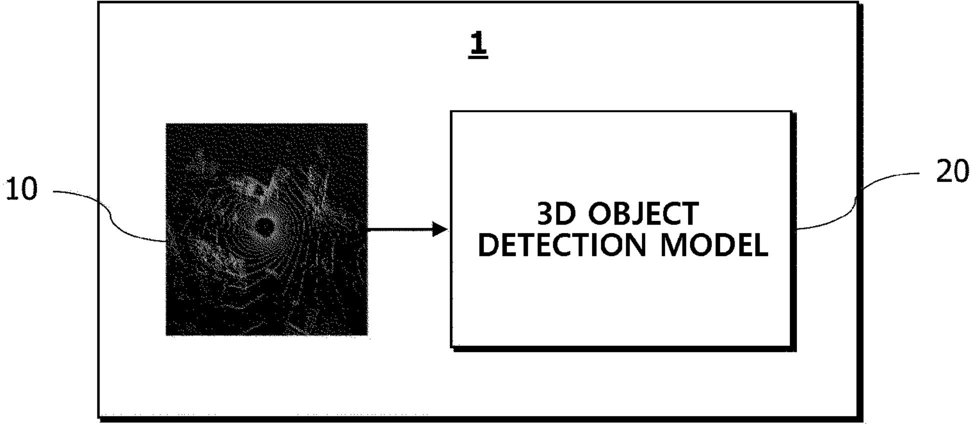
FIG. 1 is a schematic diagram illustrating an apparatus including a three-dimensional (3D) object detection model according to an embodiment of the present invention.

Hereinafter, exemplary embodiments according to the present invention will be described in detail with reference to the accompanying drawings. The following detailed description set forth below in conjunction with the accompanying drawings is intended to illustrate exemplary embodiments of the invention and is not intended to represent the only embodiments in which the invention may be practiced. In the drawings, parts irrelevant to the description may be omitted for the clarity of explanation, and like numbers refer to like elements throughout the description of the drawings.

FIG. 1 is a schematic diagram illustrating an apparatus including a three-dimensional (3D) object detection model according to an embodiment of the present invention.

Referring to FIG. 1, an apparatus 1 including a three-dimensional (3D) object detection model 20 (hereinafter referred to as an apparatus 1) is illustrated. According to an embodiment of the present invention, the apparatus 1 may employ any apparatus without limitation as long as it is an apparatus for detecting a 3D object, such as a vehicle or a surveillance camera. Hereinafter, for the sake of convenience of description, it is assumed that the apparatus 1 is a vehicle, particularly, a vehicle equipped with an autonomous driving function.

The apparatus 1 may acquire point cloud data 10 of an object to be detected using Light Detection and Ranging (LiDAR), and input the point cloud data 10 into a 3D object detection model 20 to obtain a result. In this case, the result may be class information, a 3D coordinate position, a size, a height from the ground, direction information, and the like, of a 3D object. The apparatus 1 may perform braking control, direction change, and the like of the vehicle during autonomous driving using the result acquired from the 3D object detection model 20.

Meanwhile, when the 3D object detection model 20 with high-performance needs to be mounted on the apparatus 1, there may be a difficulty due to limitation of spatial resources of the vehicle or limitation of communication resources.

Accordingly, the present invention proposes an electronic apparatus for weight reduction of a 3D object detection model using knowledge distillation, capable of using point cloud data and generating a 3D object detection model with higher performance, and a method thereof.

Hereinafter, an electronic apparatus and method for weight reduction of a 3D object detection model based on knowledge distillation according to an embodiment of the present invention will be described in more detail with reference to the drawings.

Figure 2:
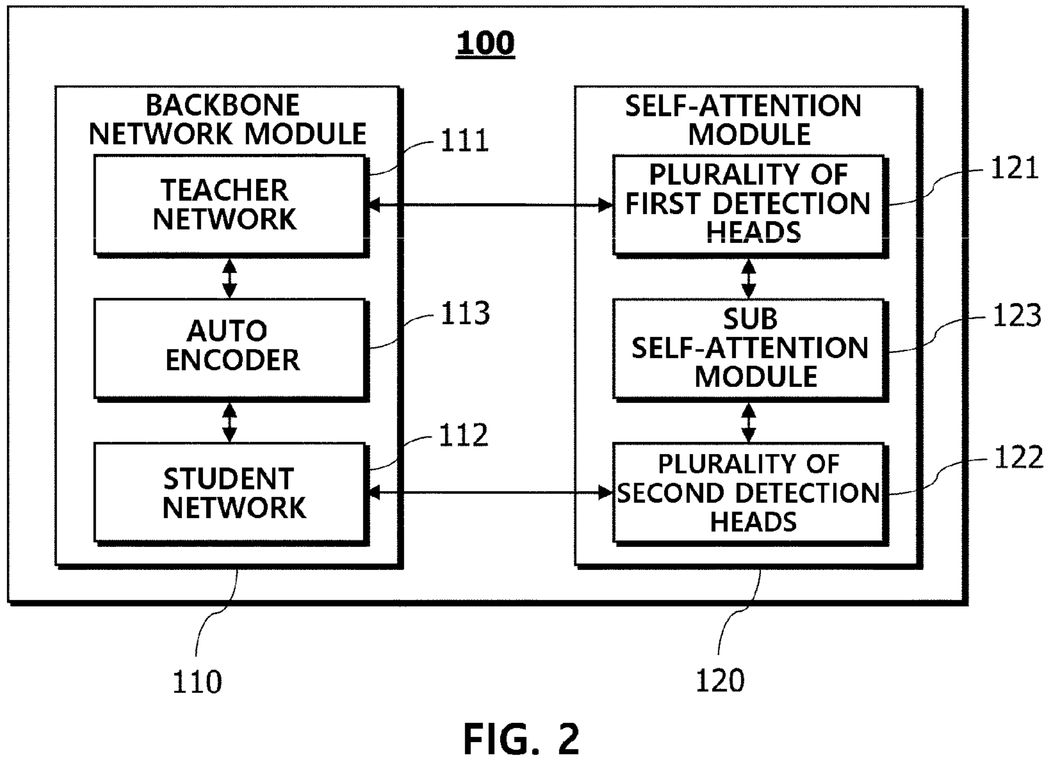
FIG. 2 is a block diagram illustrating a configuration of an electronic apparatus for weight reduction of a 3D object detection model based on knowledge distillation according to an embodiment of the present invention.

FIG. 2 is a block diagram illustrating a configuration of an electronic apparatus for weight reduction of a 3D object detection model based on knowledge distillation according to an embodiment of the present invention.

In FIG. 2, an electronic apparatus 100 for weight reduction of a 3D object detection model based on knowledge distillation (hereinafter, referred to as an electronic apparatus 100) is illustrated.

The electronic apparatus 100 largely includes a backbone network module 110 and a self-attention module 120. In this case, since knowledge distillation is performed in each of the backbone network module 110 and the self-attention module 120, the knowledge distillation performed in the backbone network module 110 is referred to as first knowledge distillation and the knowledge distillation performed in the self-attention module 120 is referred to as second knowledge distillation as needed.

The backbone network module 110 according to an embodiment of the present invention includes a teacher network 111, a student network 112, and an auto encoder 113 that allows the student network 112 to imitate a feature map extracted from the teacher network 111.

The teacher network 111 is a network in which a 3D object detection technique is learned in advance, and includes a convolutional neural network having a large number of parameters and a deep depth.

On the other hand, the student network 112 is a lightweight network having fewer parameters and a shallow depth compared to the teacher network 111. When the student network 112 imitates the teacher network 111 with high performance, the apparatus 1 shown in FIG. 1, equipped with the lightweight student network 112, may implement a high performance 3D object detection technology.

The auto-encoder 113 includes an encoder that compresses a high-dimensional feature map in a channel dimension to generate a compressed representation, and a decoder that decompresses compressed features of the teacher network 111 and the student network 112 in a channel dimension to perform interchange reconstruction. Details of the operation of the auto encoder 113 will be described with reference to FIGS. 3 and 4.

The self-attention module 120 according to an embodiment of the present invention includes a plurality of first detection heads 121 connected to the teacher network 111, a plurality of second detection heads 122 connected to the student network 112, and a sub self-attention module 123 (hereinafter referred to as a sub-module 123).

Each detection head of the plurality of first detection heads 121 and the plurality of second detection heads 122 may predict detection information including class information, a 3D coordinate position, a size, a height from the ground, direction information, and the like of an object. In this case, the type of detection information or the number of detection heads is not limited to any one of the above.

The sub-module 123 according to an embodiment of the present invention perform knowledge distillation using a relation-aware self-attention calculated based on the detection information obtained from the plurality of first detection heads 121.

In this case, the knowledge distillation using the relation-aware self-attention obtained through the sub-module 123, in comparison to a case in which the student network 112 directly imitates detection information acquired by the detection head of the teacher network 111, implements higher detection performance, and prevents an incorrect result from being detected by receiving incorrect knowledge from the teacher network.

Details of the operation of the sub-module 123 will be described with reference to FIGS. 3 and 4.

Figure 3:
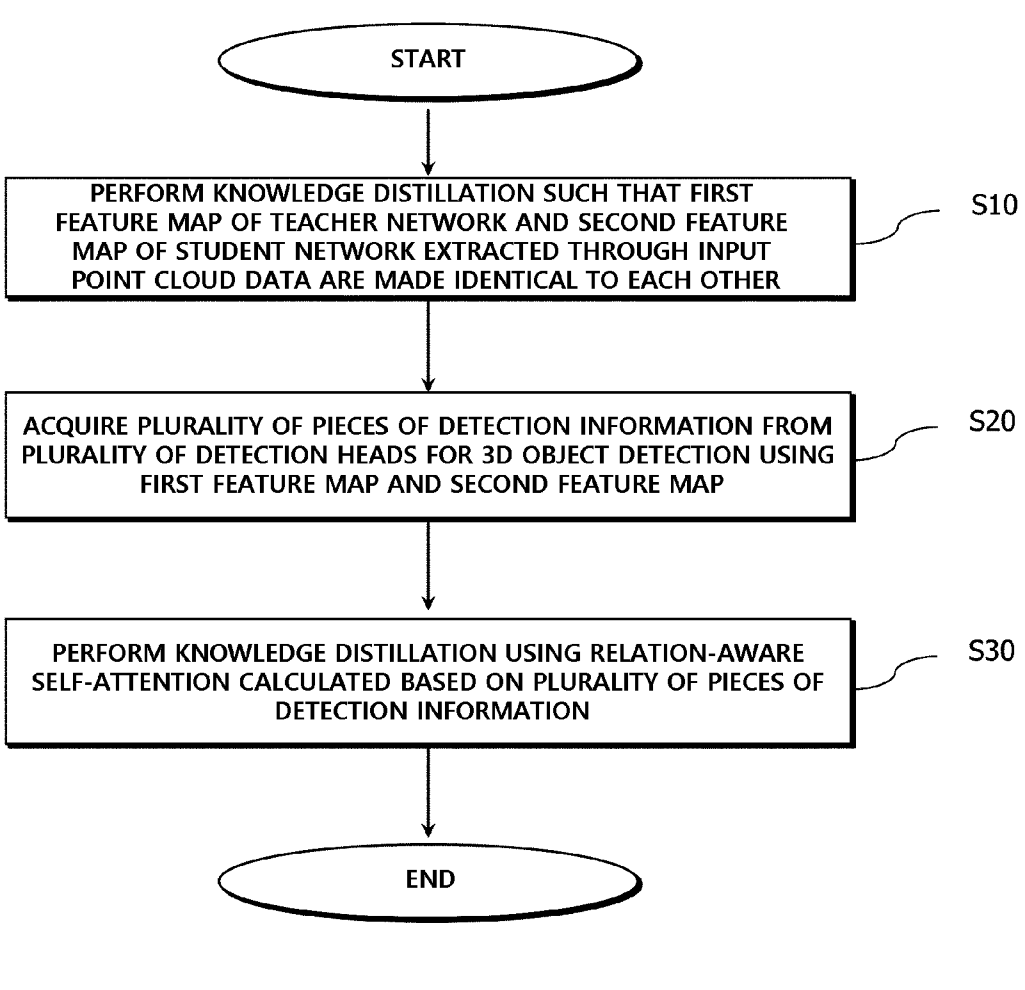
FIG. 3 is a diagram illustrating a flowchart of operations of an electronic apparatus according to an embodiment of the present invention.

FIG. 3 is a diagram illustrating a flowchart of operations of an electronic apparatus according to an embodiment of the present invention.

According to an embodiment of the present invention, the backbone network module 110 performs knowledge distillation such that a first feature map of the teacher network 111 and a second feature map of the student network 112 extracted through input point cloud data are made identical to each other (S10).

In this case, the input point cloud data may be pre-stored in the electronic apparatus 100 or may be received from the outside, and may include a plurality of pieces of point cloud data.

The teacher network 111 may extract the first feature map using the point cloud data, and the student network 112 may extract the second feature map using the point cloud data.

The backbone network module 110 may generate first compressed data and second compressed data from the first feature map and the second feature map, respectively, using the encoder of the auto encoder 113, and perform knowledge distillation such that the first compressed data and the second compressed data are made identical to each other.

More specifically, the backbone network module 110 may compress the high-dimensional first feature map and second feature map into a low-dimensional channel dimension to generate the first compressed data and the second compressed data.

Then, the backbone network module 110 may make compressed representations included in the compressed data of the two networks, that is, the teacher network 111 and the student network 112, match each other, and distill knowledge on the class and location information of the object.

The backbone network module 110 may reconstruct the second feature map from the first compressed data and reconstruct the first feature map from the second compressed data using the decoder of the auto encoder 113.

That is, the decoder of the auto encoder 113 according to an embodiment of the present invention performs interchange reconstruction on the teacher network 111 and the student network 112.

Interchange-reconstruction is a method of reconstructing a high-dimensional representation of the teacher network 111 from a compressed representation of the student network 112 and reconstructing a high-dimensional representation of the student network 112 from a compressed representation of the teacher network 111 using a decoder.

Through the interchange reconstruction, the student network 112 may imitate the knowledge of the teacher network 111, and the teacher network 111 may obtain feedback about insufficient knowledge of the student network 112 and finally perform interchange transfer. Through the interchange transfer, the student network 112 imitates detailed knowledge, such as the size and direction of an object, included in the teacher network 111 and reflects the detailed knowledge in the backbone network module 110.

According to an embodiment of the present invention, the self-attention module 120 acquires a plurality of pieces of detection information from a plurality of detection heads for 3D object detection, respectively, using the first feature map and the second feature map (S20).

According to an embodiment of the present invention, the first feature map and the second feature map shared with the self-attention module 120 for 3D object detection refer to feature maps that are mutually imitated and interchange-reconstructed in the backbone network module 110.

A 3D object detection model may have a plurality of detection heads as constituent components to draw a three-dimensional object bounding box.

The plurality of detection heads for 3D object detection may include, for example, a head $v_{hm}$ for predicting the class of an object to be detected, a head $v_o$ for predicting the coordinates of the center point of the object, a head $v_h$ for predicting the height of the object from the ground, a head $v_s$ for predicting the 3D size, and a head $v_r$ for predicting the direction of the object. In this case, the type of detection information predicted by the detection head or the number of detection heads is not limited thereto.

The self-attention module 120 may acquire a plurality of pieces of first detection information from a plurality of first detection heads connected to the teacher network 111 using the first feature map, and acquire a plurality of pieces of second detection information from a plurality of second detection heads connected to the student network 112 using the second feature map.

According to an embodiment of the present invention, the self-attention module 120 performs knowledge distillation using a relation-aware self-attention calculated based on the plurality of pieces of detection information (S30).

According to an embodiment of the present invention, the pieces of detection information acquired from the respective detection heads have an organic relationship with each other. Therefore, compared to using detection information itself acquired from a detection head about a single 3D object, the performance of the 3D object detection model may be further improved by calculating a relation-aware self-attention, which is a correlation between pieces of detection information and performing knowledge distillation.

According to an embodiment of the present invention, the self-attention module 120 may identify the similarity between detection information through a dot-product of a vector obtained from the detection information to calculate the relation-aware self-attention.

The student network 112 may imitate the teacher network 111 by imitating the relation-aware self-attention identified from the plurality of first detection heads 121 connected to the teacher network 111 as knowledge.

According to an embodiment of the present invention, a lightweight student network with high performance may be generated.

According to an embodiment of the present invention, the interchange reconstruction may implement a highly improved effect of knowledge distillation over a method of reconstructing the original input (self-reconstruction).

According to an embodiment of the present invention, the performance of the student network may be further improved through knowledge distillation based on relation-aware self-attention.

Figure 4:
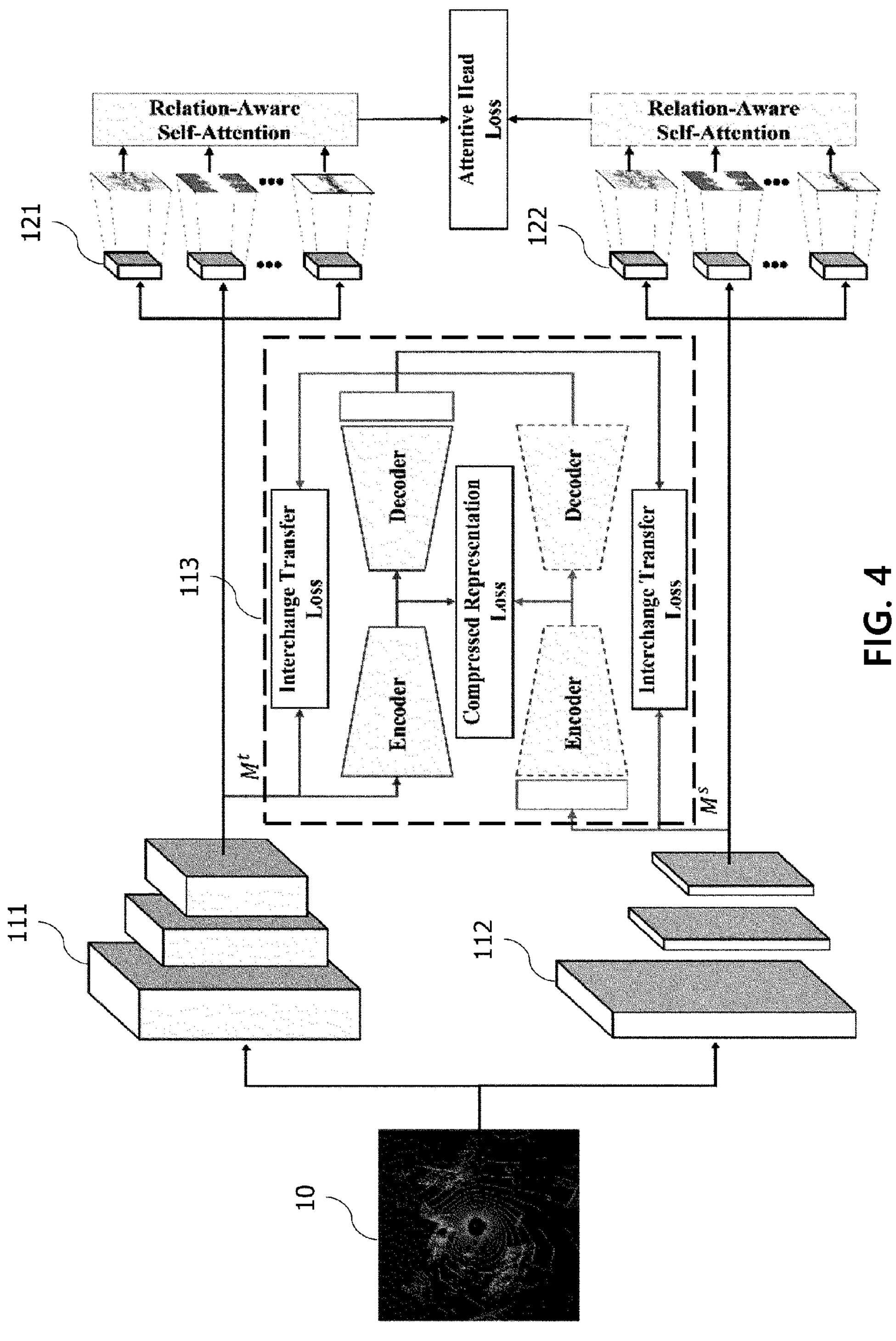
FIG. 4 is a diagram illustrating a process of operations of an electronic apparatus according to an embodiment of the present invention.

FIG. 4 is a diagram illustrating a process of operations of an electronic apparatus according to an embodiment of the present invention.

In FIG. 4, a visualization of an operation flow of the electronic apparatus 100 described with reference to FIG. 3 is illustrated.

According to an embodiment of the present invention, when point cloud data 10 is input to each of the teacher network 111 and the student network 112, the teacher network 111 extracts a first feature map Mt, and the student network 112 extracts a second feature map Ms.

The extracted first and second feature map Mt and Ms are compressed and interchange-reconstructed through the auto encoder 113. Accordingly, the teacher network 111 may acquire feedback about insufficient knowledge of the student network, and the student network 112 may imitate the first feature map of the teacher network 111 in which the feedback is reflected.

In this case, the backbone network module 110 performs knowledge distillation by allowing the auto encoder 113 including the encoder and the decoder to be shared between the teacher network 111 and the student network 112, and thus has higher knowledge distillation performance in comparison to a case in which the auto encoder 113 is not shared.

The first feature map Mt and the second feature map Ms supplemented by the auto encoder 113 are respectively shared by the plurality of first detection heads 121 and the plurality of second detection heads 122.

Each of the detection heads may acquire detection information corresponding to the detection head from the shared feature map and analyze the correlation between the pieces of detection information, and the student network 112 may imitate a final analysis result of the teacher network 111. Details of the sub-module 123 for the operation will be described with reference to FIG. 5.

Figure 5:
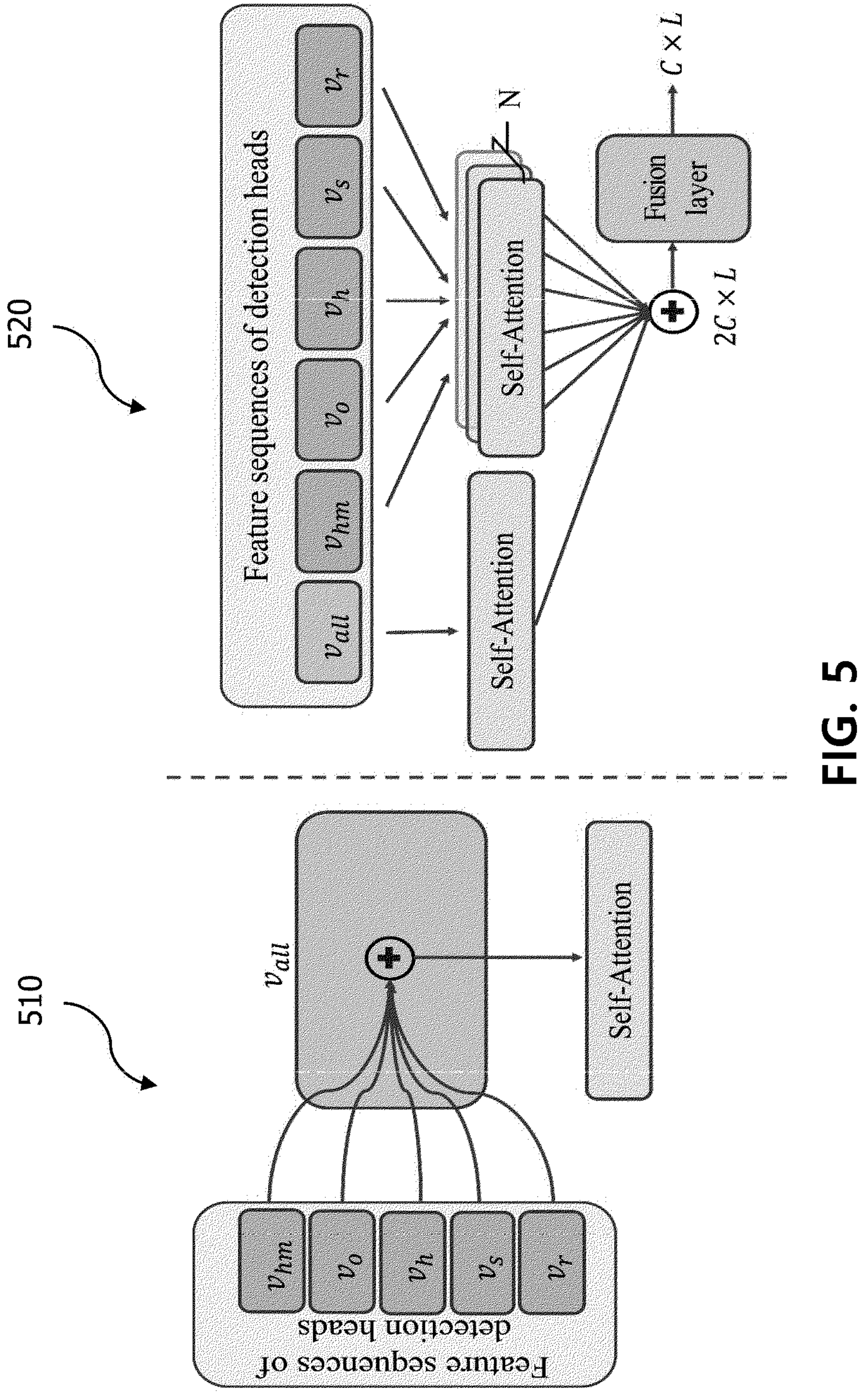
FIG. 5 is a diagram illustrating a process of operations of a self-attention module of an electronic apparatus according to an embodiment of the present invention.

FIG. 5 is a diagram illustrating a process of operations of a self-attention module of an electronic apparatus according to an embodiment of the present invention.

According to an embodiment of the present invention, the sub-module 123 analyzes the correlation between pieces of detection information in the following structure.

Correlation analysis includes an inter-relation attention 510 that calculates a relationship between detection heads, an intra-relation attention that calculates a relationship inside a detection head, and a relation-aware self-attention 520 that represents fusion of the inter-relation attention and the intra-relation attention.

According to an embodiment of the present invention, the sub-module 123 performs knowledge distillation using a relation-aware self-attention.

More specifically, the self-attention module 120 may calculate an inter-relation attention between a plurality of pieces of first detection information and an intra-relation attention between a plurality of pieces of third detection information each of which is obtained from a corresponding one of the plurality of first detection heads and related to a different object.

The intra-relation attention has N intra-relation attentions that highlight important information in results of each detection. That is, the intra-relation attention may be an intra-relation attention between a plurality of pieces of detection information about different objects in point cloud data or about different objects obtained from a plurality of pieces of point cloud data.

The relation-aware self-attention fuses the N intra-relation attentions and the inter-relation attention to produce a detection result of a 3D object.

According to an embodiment of the present invention, relation-aware self-attention is used as knowledge of knowledge distillation, so that a student network with higher performance may be acquired.

As is apparent from the above, according to an embodiment of the present invention, a lightweight student network with high performance can be generated.

According to an embodiment of the present invention, a highly improved effect of knowledge distillation can be implemented through interchange reconstruction.

According to an embodiment of the present invention, the performance of a student network can be further improved through knowledge distillation based on relation-aware self-attention.

What is claimed is:

1. An electronic apparatus for lightweight of a three dimensional (3D) object detection model based on knowledge distillation, the electronic apparatus comprising:

a backbone network module configured to perform knowledge distillation such that a first feature map of a teacher network and a second feature map of a student network are made identical to as each other, wherein the first feature map and the second feature map are extracted through input point cloud data; and a self-attention module configured to acquire a plurality of pieces of detection information from a plurality of detection heads for 3D object detection, respectively, using the first feature map and the second feature map, and perform knowledge distillation using a relation-aware self-attention calculated based on the acquired plurality of pieces of detection information, wherein the self-attention module includes:

a plurality of first detection heads connected to the teacher network and acquiring a plurality of pieces of first detection information using the first feature map;

a plurality of second detection heads connected to the student network and acquiring a plurality of pieces of second detection information using the second feature map; and a sub self-attention module performing knowledge distillation using the relation-aware self-attention calculated based on the plurality of pieces of first detection information.

2. The electronic apparatus of claim 1, wherein the backbone network module is configured to:

generate first compressed data and second compressed data from the first feature map and the second feature map, respectively, using an encoder; and perform the knowledge distillation such that the first compressed data and the second compressed data are made identical to each other.

3. The electronic apparatus of claim 2, wherein the backbone network module is configured to:

reconstruct the second feature map from the first compressed data and reconstruct the first feature map from the second compressed data using a decoder.

4. The electronic apparatus of claim 3, wherein the backbone network module is configured to:

allow an auto-encoder including the encoder and the decoder to be shared between the teacher network and the student network to perform the knowledge distillation.

5. The electronic apparatus of claim 1, wherein the self-attention module is configured to:

calculate an inter-relation attention between the plurality of pieces of first detection information and an intra-relation attention between a plurality of pieces of third detection information each of which is obtained from a corresponding one of the plurality of first detection heads and related to a different object; and calculate an inter-relation attention between the plurality of pieces of second detection information and an intra-relation attention between a plurality of pieces of fourth detection information each of which is obtained from a corresponding one of the plurality of second detection heads and related to a different object.

6. The electronic apparatus of claim 5, wherein the self-attention module is configured to perform the knowledge distillation using the relation-aware self-attention that is obtained by fusing the inter-relation attention and the intra-relation attention of the teacher network.

7. A method of performing weight-lightening on a three dimensional (3D) object detection model based on knowledge distillation in an electronic apparatus, the method comprising:

performing first knowledge distillation such that a first feature map of a teacher network and a second feature map of a student network are made identical to as each other, wherein the first feature map and the second feature map are extracted through input point cloud data; and acquiring a plurality of pieces of detection information from a plurality of detection heads for 3D object detection, respectively, using the first feature map, and the second feature map, and performing second knowledge distillation using a relation-aware self-attention calculated based on the acquired plurality of pieces of detection information, wherein the performing of the second knowledge distillation includes:

acquiring a plurality of pieces of first detection information from a plurality of first detection heads connected to the teacher network using the first feature map;

acquiring a plurality of pieces of second detection information from a plurality of second detection heads connected to the student network using the second feature map; and performing the second knowledge distillation from a sub self-attention module using the relation-aware self-attention calculated based on the plurality of pieces of first detection information.

8. The method of claim 7, wherein the performing of the first knowledge distillation includes:

generating first compressed data and second compressed data from the first feature map and the second feature map, respectively, using an encoder; and performing the first knowledge distillation such that the first compressed data and the second compressed data are made identical to each other.

9. The method of claim 8, wherein the performing of the first knowledge distillation includes reconstructing the second feature map from the first compressed data and reconstructing the first feature map from the second compressed data using a decoder.

10. The method of claim 9, wherein the performing of the first knowledge distillation includes allowing an auto-encoder including the encoder and the decoder to be shared between the teacher network and the student network to perform the knowledge distillation.

11. The method of claim 7, wherein the performing of the second knowledge distillation includes:

calculating an inter-relation attention between the plurality of pieces of first detection information and an intra-relation attention between a plurality of pieces of third detection information each of which is obtained from a corresponding one of the plurality of first detection heads and related to a different object; and calculating an inter-relation attention between the plurality of pieces of second detection information and an intra-relation attention between a plurality of pieces of fourth detection information each of which is obtained from a corresponding one of the plurality of second detection heads and related to a different object.

12. The method of claim 11, wherein the performing of the second knowledge distillation includes performing the knowledge distillation using the relation-aware self-attention that is obtained by fusing the inter-relation attention and the intra-relation attention of the teacher network.

* * * * *